(12) United States Patent
Endo

(10) Patent No.: US 12,689,205 B2
(45) Date of Patent: Jul. 21, 2026

(54) POWER SUPPLY CIRCUIT PROTECTION DEVICE AND POWER SUPPLY CIRCUIT PROTECTION METHOD

(71) Applicant: Alps Alpine Co., LTD., Tokyo (JP)

(72) Inventor: Futoshi Endo, Iwaki-city (JP)

(73) Assignee: Alps Alpine Co., LTD., Tokyo (JP)

( * ) Notice: Subject to any disclaimer, the term of this patent is extended or adjusted under 35 U.S.C. 154(b) by 228 days.

(21) Appl. No.: 18/383,588

(22) Filed: Oct. 25, 2023

(65) Prior Publication Data

US 2024/0170945 A1 May 23, 2024

(30) Foreign Application Priority Data

Nov. 22, 2022 (JP) ................................. 2022-186246

(51) Int. Cl.
*H02H 3/20* (2006.01)
*H02H 1/00* (2006.01)
(Continued)

(52) U.S. Cl.
CPC ............ *H02H 3/20* (2013.01); *H02H 1/0007* (2013.01); *H02H 5/04* (2013.01); *H05B 45/56* (2020.01)

(58) Field of Classification Search
CPC .......... H02H 3/20; H02H 1/0007; H02H 5/04; H05B 45/56; H05B 45/325; H05B 45/345;
(Continued)

(56) References Cited

U.S. PATENT DOCUMENTS

| | | | |
|---|---|---|---|
| 6,617,808 B2 * | 9/2003 | Ito | H05B 41/2926 |
| | | | 315/246 |
| 11,612,036 B2 * | 3/2023 | Chiang | H05B 45/46 |

(Continued)

FOREIGN PATENT DOCUMENTS

| | | |
|---|---|---|
| JP | 7-177730 | 7/1995 |
| JP | H-11223804 A | 8/1999 |

(Continued)

OTHER PUBLICATIONS

Extended European Search Report in European application No. 23209822.8 dated May 21, 2024, 9 pages.
(Continued)

*Primary Examiner* — Monica Lewis
*Assistant Examiner* — Nicolas Bellido
(74) *Attorney, Agent, or Firm* — Crowell & Moring LLP

(57) ABSTRACT

A power supply circuit protection device has a PWM control circuit and a voltage sensor that detects an input voltage to be supplied to a step-up power supply circuit. When it is sensed that the input voltage detected by the voltage sensor satisfies a predetermined voltage condition, the PWM control circuit sets the duty cycle of a PWM signal to a value smaller than a duty cycle setting at a normal time. On the basis that the load of the step-up power supply circuit correlates to the input voltage, the input voltage to the step-up power supply circuit is detected by the voltage sensor. This enables the load of the step-up power supply circuit to be more accurately detected. Therefore, when the duty cycle of the PWM signal is set to a value smaller than at the normal time, the load of the step-up power supply circuit is reduced.

12 Claims, 13 Drawing Sheets

1A

BACKLIGHT

TEMPERATURE SENSOR — 12

— 11

— 10

— 21A PWM CONTROL CIRCUIT

— 22 CURRENT CONTROL CIRCUIT $V_{OUT}$ — 23 STEP-UP POWER SUPPLY CIRCUIT

— 20A

— 24 VOLTAGE SENSOR $V_{IN}$

BACKLIGHT CONTROL DEVICE

(51) Int. Cl.
    *H02H 5/04*         (2006.01)
    *H05B 45/56*       (2020.01)

(58) Field of Classification Search
    CPC ..... H05B 45/37; H05B 45/50; H02M 1/0022;
           H02M 1/327; H02M 1/32; H02M 3/156;
               G01D 21/02; G09G 3/3406; G09G
                      2330/04; G09G 2330/045
    See application file for complete search history.

(56) References Cited

U.S. PATENT DOCUMENTS

2002/0109467 A1 *  8/2002  Ito ...................... H05B 41/2923
                                          315/307
2002/0130786 A1    9/2002  Weindorf
2010/0045194 A1 *  2/2010  Peker ................... H05B 45/325
                                       315/185 R 2019/0059145 A1 *  2/2019  Miyoshi ............... G09G 3/3406
2022/0361305 A1 *  11/2022  Chiang ................. H05B 45/54

FOREIGN PATENT DOCUMENTS

| | | |
|---|---|---|
| JP | 2002-319498 A | 10/2002 |
| JP | 2010-49809 | 3/2010 |
| JP | 2013-033644 A | 2/2013 |
| JP | 2014-150010 A | 8/2014 |
| JP | 2015-13560 | 1/2015 |
| JP | 2022099265 A * | 7/2022 |

OTHER PUBLICATIONS

Japanese-language Office Action issued in Japanese Application No. 2022-186246 dated Apr. 22, 2026 with English translation (13 pages).

* cited by examiner

POWER SUPPLY CIRCUIT PROTECTION DEVICE AND POWER SUPPLY CIRCUIT PROTECTION METHOD

RELATED APPLICATION

The present application claims priority to Japanese Patent Application Number 2022-186246, filed Nov. 22, 2022, the entirety of which is hereby incorporated by reference.

BACKGROUND

1. Field of the Disclosure

The present disclosure relates to a power supply circuit protection device and a power supply circuit protection method, and more particularly to a device and method that protect parts in a power supply circuit from breakdown and a backlight control device in which the device is used.

2. Description of the Related Art

In a conventionally provided backlight for an environment-friendly liquid crystal display (LCD) in which mercury is not used, an array of light-emitting diodes (LEDs) is used as a light source. When an array of LEDs is used as the light source of a backlight, there is a demand to drive the LEDs with a constant current so that changes in chromaticity are minimized. A step-up constant-current driving method, a step-down constant-current driving method, and a step-up/down constant-current driving method are available as a method of driving LEDs with a constant current. In a vehicle-mounted liquid crystal display unit, for example, a step-up power supply circuit is used to obtain high brightness and pulse-width modulation (PWM) signals are used in display brightness adjustment.

FIG. 13 schematically illustrates an example of the structure of a liquid crystal display unit in which a conventional backlight control device in a step-up constant-current driving method is used. The conventional liquid crystal display unit 100 in FIG. 13 has a backlight 110 and a backlight control device 120. The backlight 110 has an LED matrix 111 and a temperature sensor 112. The backlight control device 120 has a PWM control circuit 121, a current control circuit 122, and a step-up power supply circuit 123.

The LED matrix 111 in the backlight 110 is composed of a plurality of LEDs. Although, in FIG. 13, only one LED row, in which LEDs are connected in series, is illustrated to simplify the drawing, there are a plurality of LED rows, each of which has a structure similar to the structure of the one LED row. A plurality of LED rows is connected in parallel to form the LED matrix 111.

The step-up power supply circuit 123 in the backlight control device 120 raises an input voltage $V_{IN}$ to a predetermined voltage higher than it and then applies an output voltage $V_{OUT}$, resulting from the raising, to the anode side of the LED matrix 111. The input voltage $V_{IN}$ is, for example, a power supply voltage supplied from a battery (not illustrated) mounted in a vehicle.

The PWM control circuit 121 and current control circuit 122 are used for dimming of the LED matrix 111. The PWM control circuit 121 generates a PWM signal composed of a pulse wave the duty cycle of which is set according to a time ratio matching a dimming ratio and then supplies the PWM signal to the current control circuit 122. In a period during which the pulse of the PWM signal is turned on, the current control circuit 122 draws a constant current from the cathode side of the LED matrix 111 to control dimming of the LED matrix 111.

The temperature sensor 112 in the backlight 110 detects temperature in the backlight 110 and notifies the PWM control circuit 121 of the temperature. When the PWM control circuit 121 senses that the temperature detected by the temperature sensor 112 has reached or exceeded a predetermined value, the PWM control circuit 121 lowers the duty cycle of the PWM signal to suppress heat generated by the LED matrix 111 and thereby protect the LED matrix 111. Technologies that control dimming according to the result of detection by the temperature sensor 112 as described above are disclosed in, for example, JP2010-49809 A and JP2015-13560 A.

As the sizes of recent displays has been increased, further higher brightness is demanded for the backlight, so the loads of parts used in the step-up power supply circuit 123 has been increased. Particularly, this is problematic when the input voltage $V_{IN}$ to be supplied to the step-up power supply circuit 123 is a low voltage, in which case a boosting range by which to raise the input voltage $V_{IN}$ to the output voltage $V_{OUT}$ becomes large, increasing a load due to a power loss. At the worst, a part is destroyed due to heat generated by the step-up power supply circuit 123 itself.

A possible solution to the above problem is to detect the amount of heat generated in the step-up power supply circuit 123 with a temperature sensor attached in the vicinity of the step-up power supply circuit 123 for protection purposes. However, even when a temperature sensor is attached in the vicinity of the step-up power supply circuit 123, a difference in temperature is likely to occur depending on the position at which the temperature sensor is attached. Furthermore, the ambient temperature is included in the sensed temperature. Therefore, it is difficult to use a temperature sensor to accurately determine a high load due to a power loss.

A known technology protects a step-up direct current (DC)-direct current (DC) converter configured to provide an output voltage stabilized by pulse-width control when an input voltage to the DC-DC converter falls to or below a voltage setting, by stopping the operation of a control integrated circuit (IC) (see JP7-177730 A, for example). If the technology described in JP7-177730 A is applied to a backlight control device, when the input voltage $V_{IN}$ to the step-up power supply circuit 123 falls to or below the voltage setting, the operation of the step-up power supply circuit 123 stops, causing the display to be blacked out.

SUMMARY

The present disclosure addresses the above problem with the objective of more accurately detecting the load of a power supply circuit and protecting parts in the power supply circuit from breakdown.

In the present disclosure, to address the problem described above, a voltage detection unit is provided that detects an input voltage to be supplied to a power supply circuit that transforms the input voltage and applies, as a power supply voltage, an output voltage, resulting from the transformation, to a circuit eligible for being controlled. When it is sensed that the input voltage detected by the voltage detection unit satisfies a predetermined voltage condition, a control signal is generated that is composed of a pulse wave having a duty cycle set to a value smaller than a duty cycle setting at a normal time. The operation of the circuit eligible for being controlled is controlled according to the control signal.

In implementations of the present disclosure configured as described above, since the load of the power supply circuit correlates to the magnitude of the input voltage, when the input voltage is detected by the voltage detection unit, the load of the power supply circuit can be more accurately detected than when the ambient temperature of the power supply circuit is detected. When it is sensed that the detected input voltage satisfies a predetermined voltage condition, the duty cycle of the control signal is set to a value smaller than the duty cycle setting at the normal time to reduce the load applied to the power supply circuit, under the assumption that a high load has been applied to the power supply circuit. Therefore, it is possible to protect parts in the power supply circuit from breakdown.

BRIEF DESCRIPTION OF THE DRAWINGS

FIG. 12 is a flowchart illustrating an example of the operation of the backlight control device in the fourth embodiment.

DETAILED DESCRIPTION

First Embodiment

Figure 1:
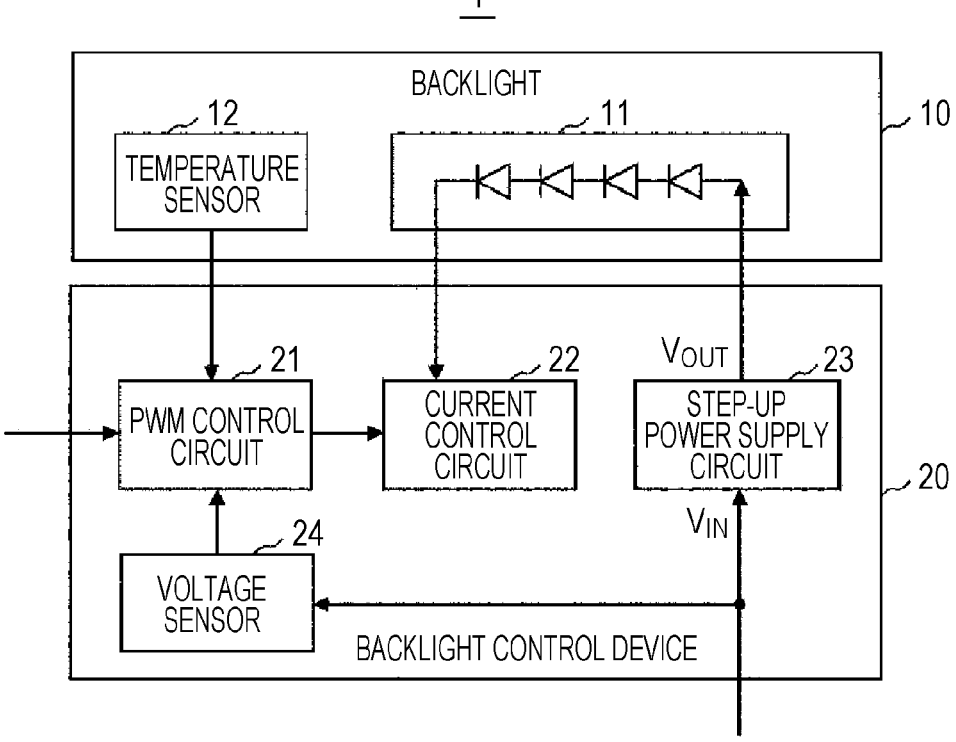
FIG. 1 illustrates an example of a structure of a liquid crystal display unit, in which a power supply circuit protection device and backlight control device in a first embodiment are applied, the backlight control device being in a step-up constant-current driving method.

A first embodiment of the present disclosure will be described below with reference to the drawings. FIG. 1 illustrates an example of the structure of a liquid crystal display unit, in which a power supply circuit protection device and backlight control device in a first embodiment are applied, the backlight control device being in a step-up constant-current driving method. The liquid crystal display unit 1 in the first embodiment is mounted in, for example, a vehicle. The display on the liquid crystal display unit 1 is controlled by an electronic device mounted in the vehicle.

As illustrated in FIG. 1, the liquid crystal display unit 1 in the first embodiment has a backlight 10 and a backlight control device 20. The backlight 10 has an LED matrix 11 and a temperature sensor 12. The LED matrix 11 is equivalent to a circuit eligible for being controlled in the scope of the claims. The temperature sensor 12 is equivalent to a temperature detection unit in the scope of the claims.

The backlight control device 20 has a PWM control circuit 21, a current control circuit 22, a step-up power supply circuit 23, and a voltage sensor 24. The power supply circuit protection device in the first embodiment is composed of the PWM control circuit 21, current control circuit 22, and voltage sensor 24. The PWM control circuit 21 is equivalent to a control signal generation unit in the scope of the claims. The current control circuit 22 is equivalent to a target circuit control unit in the scope of the claims. The step-up power supply circuit 23 is equivalent to a power supply circuit in the scope of the claims. The voltage sensor 24 is equivalent to a voltage detection unit in the scope of the claims.

The LED matrix 11 in the backlight 10 is composed of a plurality of LEDs. Although, in FIG. 1, only one LED row, in which LEDs are connected in series, is illustrated to simplify the drawing, there are a plurality of LED rows, each of which has a structure similar to the structure of the one LED row. A plurality of LED rows is connected in parallel to form the LED matrix 11.

The step-up power supply circuit 23 in the backlight control device 20 raises an input voltage VIN to a predetermined voltage higher than it and then applies an output voltage VOUT, resulting from the raising, to the anode side of the LED matrix 11. The input voltage VIN is, for example, a power supply voltage supplied from a battery (not illustrated) mounted in a vehicle. The magnitude of the voltage supplied from the battery mounted in the vehicle to the step-up power supply circuit 23 may vary depending on the situation in which the vehicle travels.

The PWM control circuit 21 generates a control signal composed of a pulse wave having a duty cycle with a variable setting. Specifically, the PWM control circuit 21 generates a PWM signal composed of a pulse wave having a duty cycle that is set according to a time ratio matching a dimming ratio specified outside the backlight control device 20 and then supplies the PWM signal to the current control circuit 22 as a control signal. The dimming ratio can be specified through a manipulation by the user on an electronic device that causes an indication to be displayed on the liquid crystal display unit 1 in this embodiment. Alternatively, the dimming ratio can be automatically specified by an electronic device according to the illumination in the room of the vehicle, the illumination being detected by an illumination sensor provided in the room.

The current control circuit 22 controls the operation of the LED matrix 11 in response to the PWM signal generated by the PWM control circuit 21. Specifically, during a period in which the pulse of the PWM signal supplied from the PWM control circuit 21 is turned on, the current control circuit 22 draws a constant current from the cathode side of the LED matrix 11 to control the dimming of the LED matrix 11.

The temperature sensor 12 in the backlight 10 detects the ambient temperature affected by heat generated by the LED matrix 11 (temperature generated in the backlight 10) and notifies the PWM control circuit 21 of the ambient temperature. When it is sensed that the ambient temperate detected by the temperature sensor 12 satisfies a predetermined temperature condition, the PWM control circuit 21 sets the duty cycle of the PWM signal to a value smaller than a duty cycle setting at a normal time to suppress heat generated by the LED matrix 11 and protect the LED matrix 11.

The predetermined temperature condition is that the ambient temperature detected by the temperature sensor 12 is higher than a predetermined temperature threshold Tht. The duty cycle setting at the normal time refers to a duty cycle setting in which the specified dimming ratio is reflected without alteration. The duty cycle can be set to a value smaller than the duty cycle setting at the normal time in any way. For example, the ratio of the duration of the period during which the PWM signal is turned on may be set so as to be lower than at the normal time by a predetermined percentage. Alternatively, the duration of the period during which the PWM signal is turned on may be set so as to be shorter than at the normal time by a predetermined time.

The voltage sensor 24 detects the input voltage VIN to be supplied to the step-up power supply circuit 23 and notifies the PWM control circuit 21 of the input voltage VIN. When it is sensed that the input voltage VIN detected by the voltage sensor 24 satisfies a predetermined voltage condition, the PWM control circuit 21 sets the duty cycle of the PWM signal to a value smaller than the duty cycle setting at the normal time to reduce the load of the step-up power supply circuit 23 and protect parts in the step-up power supply circuit 23 from breakdown, which would otherwise be caused due to a high load.

The predetermined voltage condition is that the input voltage VIN detected by the voltage sensor 24 is lower than a predetermined voltage threshold Thv. When the input voltage VIN is lower than the predetermined voltage threshold Thv, the difference between this input voltage VIN and the predetermined output voltage VOUT becomes large. Therefore, it is assumed that a high load is applied to raise the input voltage VIN to the predetermined output voltage VOUT. In this embodiment, in this case as well, the duty cycle of the PWM signal is set to a value smaller than the duty cycle setting at the normal time.

Figure 2:
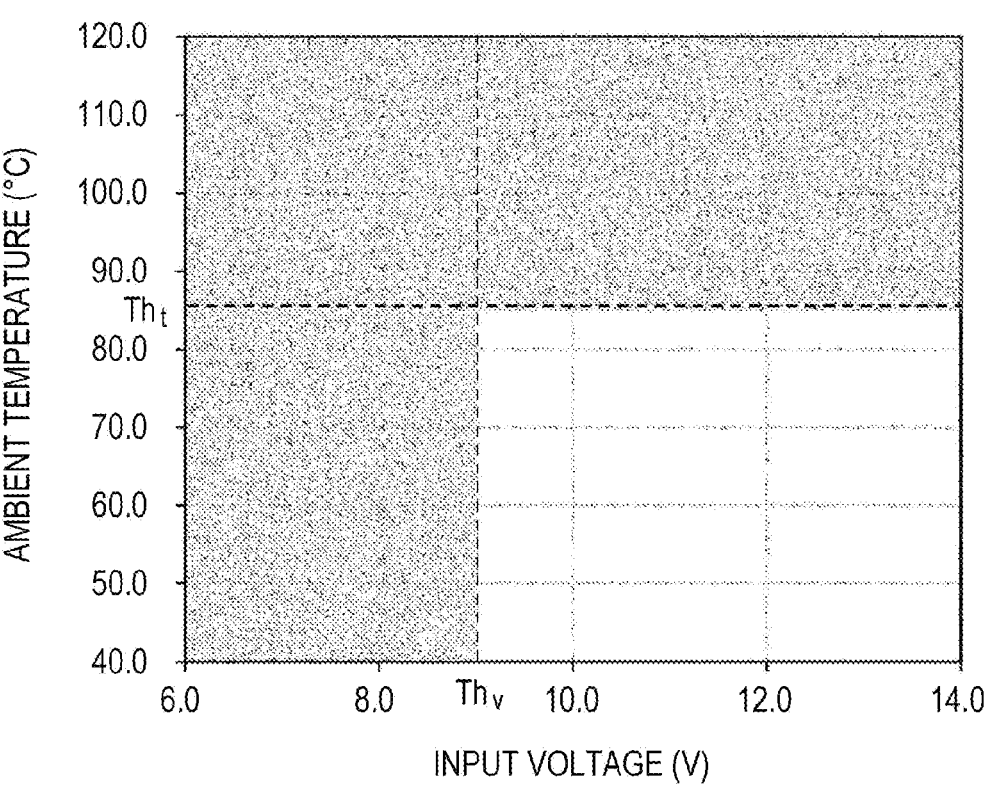
FIG. 2 illustrates control by a pulse-width modulation (PWM) control circuit in the first embodiment.

FIG. 2 illustrates control by the PWM control circuit 21 in the first embodiment. Specifically, FIG. 2 illustrates a case in which the duty cycle of the PWM signal is set to a value smaller than the duty cycle setting at the normal time. In FIG. 2, the vertical axis indicates the ambient temperature, detected by the temperature sensor 12, of the LED matrix 11, and the horizontal axis indicates the input voltage VIN, detected by the voltage sensor 24, to the step-up power supply circuit 23. In the filled-in area in FIG. 2, the duty cycle of the PWM signal is set to a value smaller than the duty cycle setting at the normal time.

Specifically, as illustrated in FIG. 2, when it is sensed that the ambient temperature, detected by the temperature sensor 12, of the LED matrix 11 is higher than the predetermined temperature threshold Tht or when it is sensed that the input voltage VIN, detected by the voltage sensor 24, to the step-up power supply circuit 23 is lower than the predetermined voltage threshold Thv, the PWM control circuit 21 sets the duty cycle of the PWM signal to a value smaller than to the duty cycle setting at the normal time.

In a case in which the ambient temperature of the LED matrix 11 satisfies the predetermined temperature condition, when the duty cycle of the PWM signal is lowered, the current consumption of the LED matrix 11 can be reduced. This reduces the load of the LED matrix 11, enabling parts in the LED matrix 11 to be protected from breakdown. In a case as well in which the input voltage VIN to the step-up power supply circuit 23 satisfies the predetermined voltage condition, when the duty cycle of the PWM signal is lowered, the current consumption of the LED matrix 11 can be reduced and the output current consumption of the step-up power supply circuit 23 can thereby be reduced. This can suppress a power loss in the step-up power supply circuit 23, enabling parts in the step-up power supply circuit 23 to be protected from breakdown.

Figure 3:
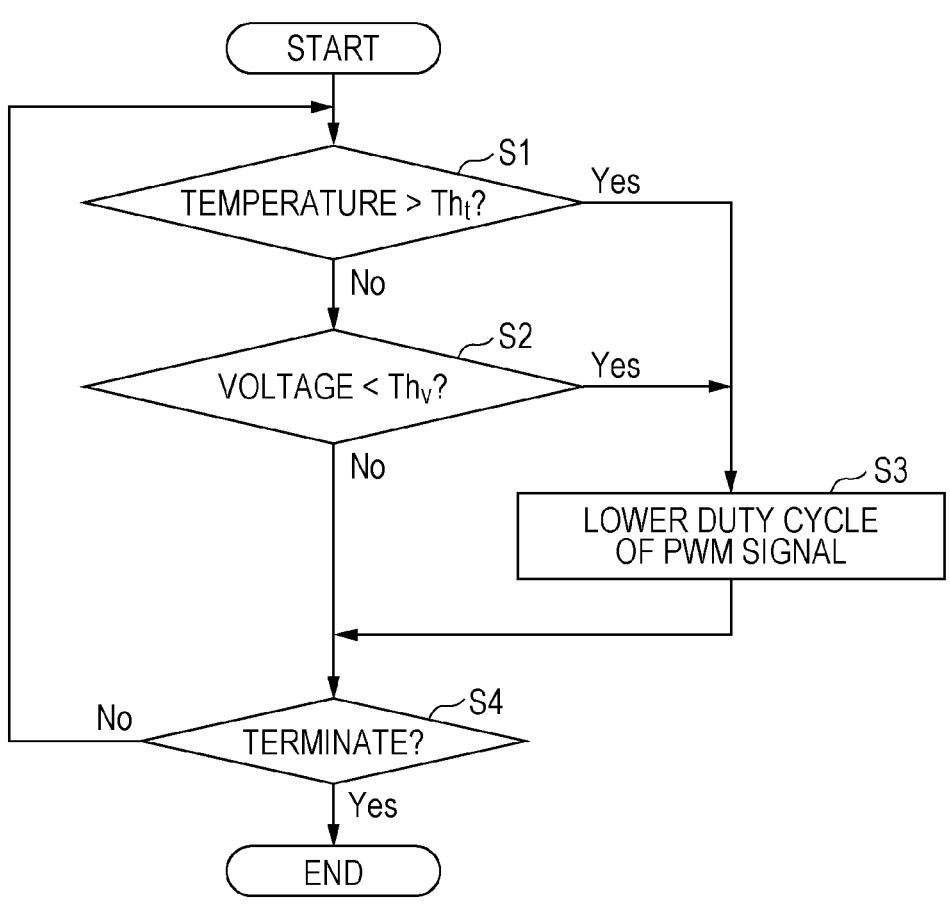
FIG. 3 is a flowchart illustrating an example of an operation of the backlight control device in the first embodiment.

FIG. 3 is a flowchart illustrating an example of the operation of the backlight control device 20 in the first embodiment. The flowchart in FIG. 3 starts when the power supply of the backlight control device 20 is turned on. In this flowchart, only an operation involved in the substance of the first embodiment is illustrated and a dimming operation and the like at the normal time are omitted.

First, the PWM control circuit 21 decides whether the ambient temperature, detected by the temperature sensor 12, of the LED matrix 11 is higher than the predetermined temperature threshold Tht (step S1). If the PWM control circuit 21 decides that the ambient temperature of the LED matrix 11 is higher than the predetermined temperature threshold Tht, the PWM control circuit 21 sets the duty cycle of the PWM signal to a value smaller than the duty cycle setting at the normal time (step S3).

If the PWM control circuit 21 decides that the ambient temperature of the LED matrix 11 is not higher than the predetermined temperature threshold Tht, the PWM control circuit 21 further decides whether the input voltage VIN, detected by the voltage sensor 24, to the step-up power supply circuit 23 is lower than the predetermined voltage threshold Thv (step S2). If the PWM control circuit 21 decides that the input voltage VIN to the step-up power supply circuit 23 is lower than the predetermined voltage threshold Thv, the PWM control circuit 21 sets the duty cycle of the PWM signal to a value smaller than the duty cycle setting at the normal time (step S3).

If the PWM control circuit 21 decides that the input voltage VIN to the step-up power supply circuit 23 is not lower than the predetermined voltage threshold Thv, the process proceeds to step S4. Upon the completion of the execution of processing in step S3, the process also proceeds to step S4. In step S4, the backlight control device 20 decides whether to terminate the process. Here, the backlight control device 20 decides whether a manipulation to turn off the power supply of the backlight control device 20 has been performed. If a manipulation to turn off the power supply has not been performed, the process returns to step S1. If a manipulation to turn off the power supply of has been performed, the process in the flowcharts in FIG. 3 is terminated.

As described above in detail, in the first embodiment, the voltage sensor 24 is provided that detects the input voltage VIN to be supplied to the step-up power supply circuit 23. When it is sensed that the input voltage VIN detected by the voltage sensor 24 satisfies a predetermined voltage condition, the PWM control circuit 21 generates a PWM signal having a duty cycle set to a value smaller than the duty cycle setting at the normal time. Then, the current control circuit 22 controls the operation, of the LED matrix 11, by which a constant current is drawn from the LED matrix 11, according to the PWM signal.

In the first embodiment configured as described above, since the load of the step-up power supply circuit 23 correlates to the magnitude of the input voltage VIN, when the input voltage VIN is detected by the voltage sensor 24, the load of the step-up power supply circuit 23 can be more accurately detected than when the ambient temperature of the step-up power supply circuit 23 is detected by a temperature sensor. When it is sensed that the detected input voltage VIN satisfies a predetermined voltage condition, the duty cycle of the PWM signal is set to a value smaller than the duty cycle setting at the normal time to reduce the load applied to the step-up power supply circuit 23. Therefore, it is possible to protect parts in the step-up power supply circuit 23 from breakdown.

Second Embodiment

Figure 4:
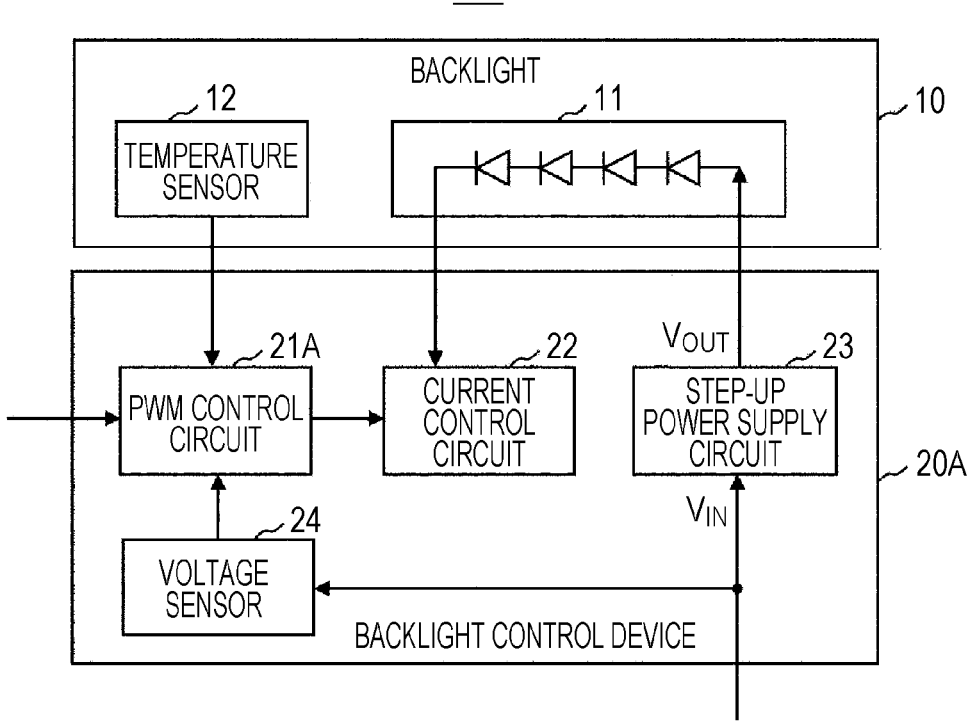
FIG. 4 illustrates an example of the structure of a liquid crystal display unit, in which a power supply circuit protection device and backlight control device in a second embodiment are applied, the backlight control device being in a step-up constant-current driving method.

Next, a second embodiment of the present disclosure will be described with reference to the drawings. FIG. 4 illustrates an example of the structure of a liquid crystal display unit, in which a power supply circuit protection device and backlight control device in a second embodiment are applied, the backlight control device being in a step-up constant-current driving method. The liquid crystal display unit 1A in the second embodiment is also mounted in, for example, a vehicle. The display on the liquid crystal display unit 1A is controlled by an electronic device mounted in the vehicle.

In FIG. 4, elements given the same reference numerals as in FIG. 1 have the same functions as the corresponding elements in FIG. 1. Therefore, repeated descriptions will be omitted. As illustrated in FIG. 4, the liquid crystal display unit 1A in the second embodiment has a backlight control device 20A instead of the backlight control device 20. The backlight control device 20A has a PWM control circuit 21A instead of the PWM control circuit 21.

In the PWM control circuit 21A, a predetermined complex voltage-and-temperature condition is used instead of the predetermined voltage condition described in the first embodiment. When it is sensed that the input voltage VIN, detected by the voltage sensor 24, to the step-up power supply circuit 23 and the ambient temperature, detected by the temperature sensor 12, of the LED matrix 11 satisfy the predetermined complex voltage-and-temperature condition, the PWM control circuit 21A sets the duty cycle of the PWM signal to a value smaller than a duty cycle setting at the normal time.

Figure 5:
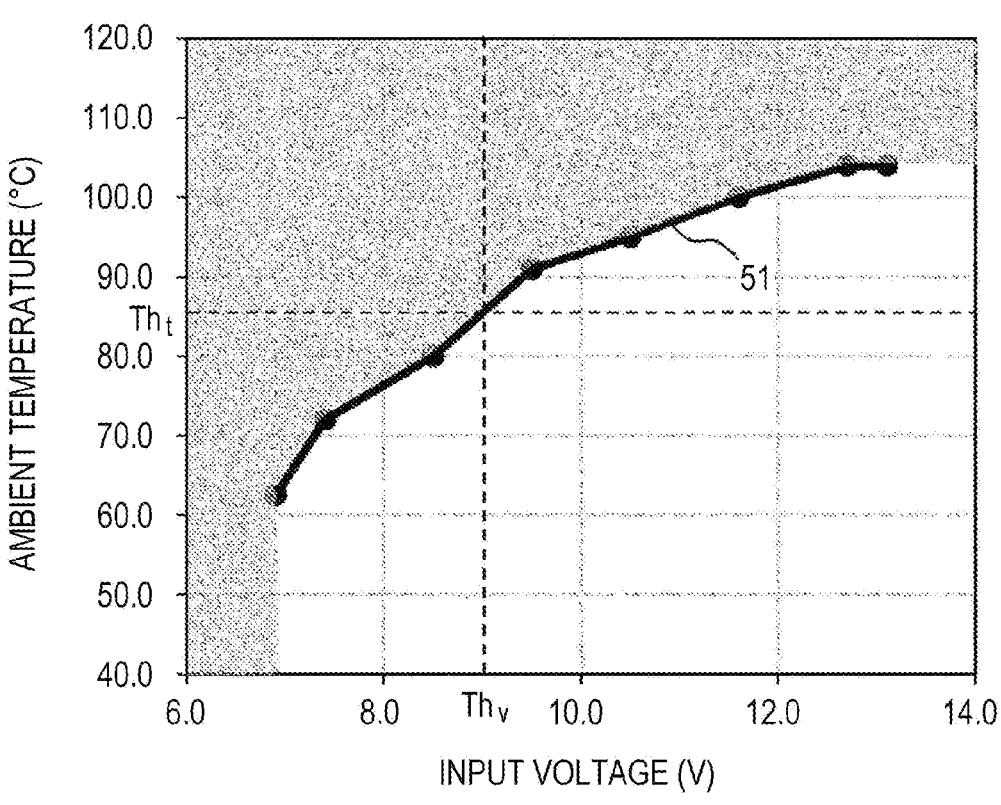
FIG. 5 illustrates control by a PWM control circuit in the second embodiment.

FIG. 5 illustrates control by the PWM control circuit 21A in the second embodiment. In FIG. 5, the vertical axis indicates the ambient temperature, detected by the temperature sensor 12, of the LED matrix 11, and the horizontal axis indicates the input voltage VIN, detected by the voltage sensor 24, to the step-up power supply circuit 23. In the filled-in area in FIG. 5, the input voltage VIN to the step-up power supply circuit 23 and the ambient temperature of the LED matrix 11 satisfy the predetermined complex voltage-and-temperature condition, that is, the duty cycle of the PWM signal is set to a value smaller than the duty cycle setting at the normal time.

A borderline 51 in FIG. 5 indicates a limit up to which the duty cycle of the PWM signal is set or is not set to a low setting. The borderline 51 can be said to indicate, for each value of the input voltage VIN to the step-up power supply circuit 23, a temperature threshold that the ambient temperature, detected by the temperature sensor 12, of the LED matrix 11 must exceed. Alternatively, the borderline 51 can be said to indicate, for each value of the ambient temperature of the LED matrix 11, a voltage threshold that the input voltage VIN, detected by the voltage sensor 24, to the step-up power supply circuit 23 must fall below.

This borderline 51 is set according to actual measurements by, for example, the temperature sensor 12 and voltage sensor 24. Specifically, the value of the input voltage VIN to be supplied to the step-up power supply circuit 23 is successively changed in a state in which the PWM control circuit 21A generates a PWM signal according to a certain dimming ratio and the current control circuit 22 controls the LED matrix 11 according to this PWM signal. The temperature sensor 12 and voltage sensor 24 detect temperatures and voltages for each plurality of input voltages VIN. The detected values are plotted on the coordinate system in FIG. 5. The black circles on the borderline 51 indicate a plurality of plots. To set the borderline 51, a certain function is used for interpolation between black circles. Alternatively, an approximating curve that approximates a plurality of plots may be obtained and may be set as the borderline 51.

When the duty cycle of the PWM signal is set to a value smaller than the duty cycle setting at the normal time, the brightness of the backlight 10 is lowered. In the second embodiment, however, conditions under which the duty cycle of the PWM signal is set to a lower value can be more finely set than in the first embodiment. Therefore, a range in which the backlight 10 can be maintained at high brightness can be widened.

Specifically, in the first embodiment, when the ambient temperature, detected by the temperature sensor 12, of the LED matrix 11 is higher than the predetermined temperature threshold Tht, the duty cycle of the PWM signal has been consistently lowered. In the second embodiment, however, only when the ambient temperature of the LED matrix 11 is higher than a temperature, on the borderline 51, that is set to a value higher than the temperature threshold Tht, the duty cycle of the PWM signal is lowered. This can widen the range in which the backlight 10 can be maintained at high brightness.

Also, in the first embodiment, when the input voltage VIN, detected by the voltage sensor 24, to the step-up power supply circuit 23 is lower than the predetermined voltage threshold Thv, the duty cycle of the PWM signal has been consistently lowered. In the second embodiment, however, only when the input voltage VIN to the step-up power supply circuit 23 is lower than a voltage, on the borderline 51, that is set to a value smaller than the voltage threshold Thv, the duty cycle of the PWM signal is lowered. This can widen the range in which the backlight 10 can be maintained at high brightness.

Figure 6:
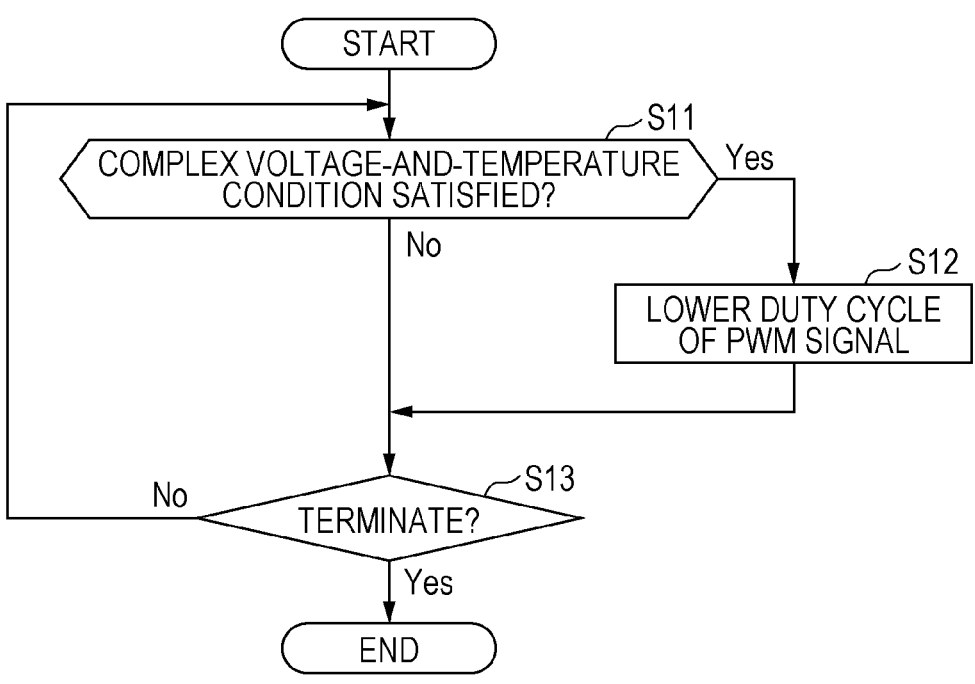
FIG. 6 is a flowchart illustrating an example of the operation of the backlight control device in the second embodiment.

FIG. 6 is a flowchart illustrating an example of the operation of the backlight control device 20A in the second embodiment. The flowchart in FIG. 6 starts when the power supply of the backlight control device 20A is turned on. In this flowchart, only an operation involved in the substance of the second embodiment is illustrated and a dimming operation and the like at the normal time are omitted.

First, the PWM control circuit 21A decides whether the ambient temperature, detected by the temperature sensor 12, of the LED matrix 11 and the input voltage VIN, detected by the voltage sensor 24, to the step-up power supply circuit 23 satisfy the predetermined complex voltage-and-temperature condition prescribed by the borderline 51 in FIG. 5 (step S11). If the PWM control circuit 21A decides that the predetermined complex voltage-and-temperature condition is satisfied, the PWM control circuit 21A sets the duty cycle of the PWM signal to a value smaller than the duty cycle setting at the normal time (step S12).

If the PWM control circuit 21A decides that the predetermined complex voltage-and-temperature condition is not satisfied, the process proceeds to step S13. Upon the completion of the execution of processing in step S12, the process also proceeds to step S13. In step S13, the backlight control device 20A decides whether to terminate the process. Here, the backlight control device 20A decides whether a manipulation to turn off the power supply of the backlight control device 20A has been performed. If a manipulation to turn off the power supply has not been performed, the process returns to step S11. If a manipulation to turn off the power supply has been performed, the process in the flowcharts in FIG. 6 is terminated.

Third Embodiment

Figure 7:
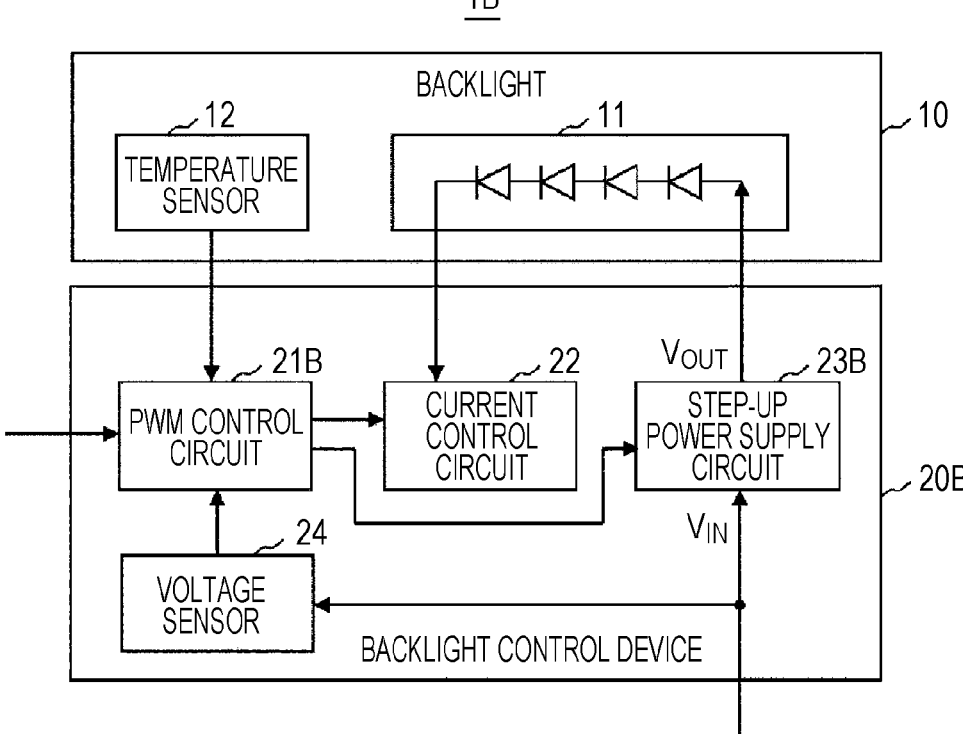
FIG. 7 illustrates an example of the structure of a liquid crystal display unit, in which a power supply circuit protection device and backlight control device in a third embodiment are applied, the backlight control device being in a step-up constant-current driving method.

Next, a third embodiment of the present disclosure will be described with reference to the drawings. FIG. 7 illustrates an example of the structure of a liquid crystal display unit, in which a power supply circuit protection device and backlight control device in a third embodiment are applied, the backlight control device being in a step-up constant-current driving method. The liquid crystal display unit 1B in the third embodiment is also mounted in, for example, a vehicle. The display on the liquid crystal display unit 1B is controlled by an electronic device mounted in the vehicle.

In FIG. 7, elements given the same reference numerals as in FIG. 4 have the same functions as the corresponding elements in FIG. 4. Therefore, repeated descriptions will be omitted. As illustrated in FIG. 7, the liquid crystal display unit 1B in the third embodiment has a backlight control device 20B instead of the backlight control device 20A. The backlight control device 20B has a PWM control circuit 21B and a step-up power supply circuit 23B instead of the PWM control circuit 21A and step-up power supply circuit 23.

If it is sensed that the ambient temperature detected by the temperature sensor 12 satisfies the predetermined temperature condition described in the first embodiment in a range in which the input voltage VIN, detected by the voltage sensor 24, to the step-up power supply circuit 23B and the ambient temperature, detected by the temperature sensor 12, of the LED matrix 11 satisfy the predetermined complex voltage-and-temperature condition described in the second embodiment, the PWM control circuit 21B sets the duty cycle of the PWM signal to a value smaller than the duty cycle setting at the normal time.

Also, if it is sensed that the ambient temperature detected by the temperature sensor 12 does not satisfy the predetermined temperature condition described in the first embodiment in the range in which the input voltage VIN, detected by the voltage sensor 24, to the step-up power supply circuit 23B and the ambient temperature, detected by the temperature sensor 12, of the LED matrix 11 satisfy the predetermined complex voltage-and-temperature condition described in the second embodiment, the PWM control circuit 21B controls the step-up power supply circuit 23B so that a boosting range by which to raise the input voltage VIN to the output voltage VOUT becomes narrower than a boosting range at the normal time, and sets the duty cycle of the PWM signal to a value equal to or greater than the duty cycle setting at the normal time.

Figure 8:
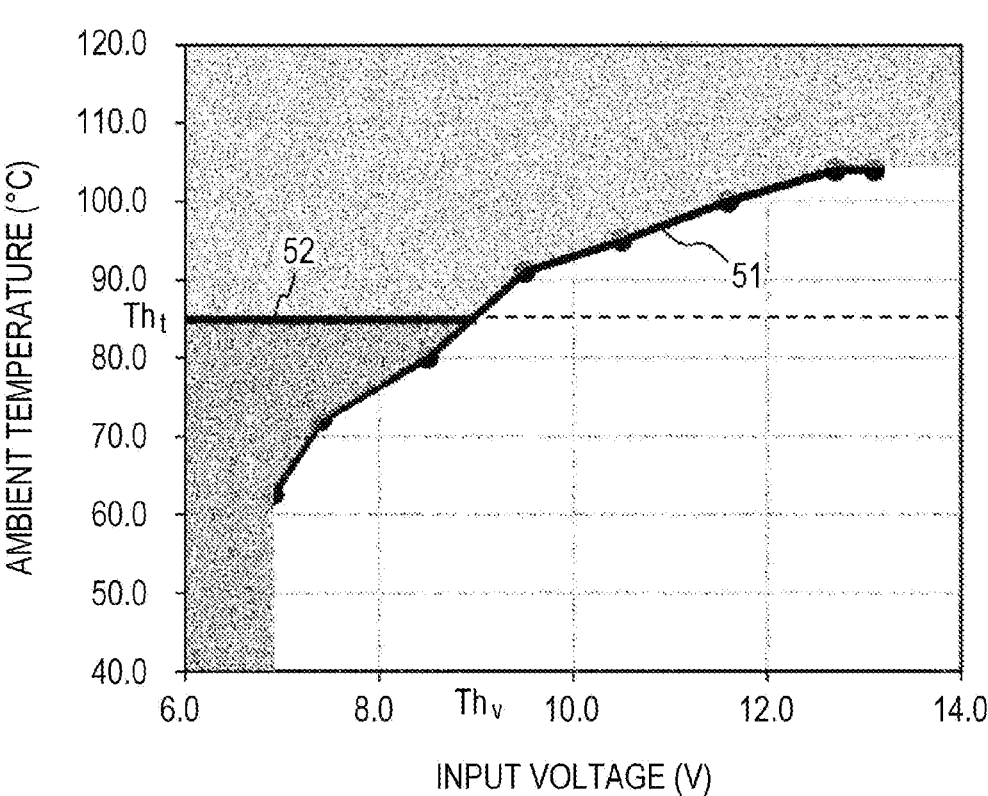
FIG. 8 illustrates control by a PWM control circuit in the third embodiment.

FIG. 8 illustrates control by the PWM control circuit 21B in the third embodiment. In FIG. 8, the vertical axis indicates the ambient temperature, detected by the temperature sensor 12, of the LED matrix 11, and the horizontal axis indicates the input voltage VIN, detected by the voltage sensor 24, to the step-up power supply circuit 23B. A first borderline 51 in FIG. 8 is identical to the borderline 51 in FIG. 5. The third embodiment differs from the second embodiment illustrated in FIG. 5 in that the filled-in area is divided into two areas by a second borderline 52. In one of them, the ambient temperature is higher than the predetermined temperature threshold Tht. In the other area, the ambient temperature is lower than or equal to the predetermined temperature threshold Tht.

In the area in which the ambient temperature of the LED matrix 11 is higher than the predetermined temperature threshold Tht, the area being one of the areas in which the predetermined complex voltage-and-temperature condition is satisfied, the areas being filled in with the first borderline 51 taken as a boundary is applicable (that is, in the area above the second borderline 52), that is, when the ambient temperature of the LED matrix 11 satisfies the predetermined temperature condition in a range in which the input voltage VIN to the step-up power supply circuit 23B and the ambient temperature of the LED matrix 11 satisfy the predetermined complex voltage-and-temperature condition, the PWM control circuit 21B sets the duty cycle of the PWM signal to a value smaller than the duty cycle setting at the normal time, as in the second embodiment.

In the area in which the ambient temperature of the LED matrix 11 is lower than or equal to the predetermined temperature threshold Tht, the area being one of the filled-in areas in which the predetermined complex voltage-and-temperature condition is satisfied (that is, in the area below the second borderline 52), that is, when the ambient temperature of the LED matrix 11 does not satisfy the predetermined temperature condition in the range in which the input voltage VIN to the step-up power supply circuit 23B and the ambient temperature of the LED matrix 11 satisfy the predetermined complex voltage-and-temperature condition, the PWM control circuit 21B controls the step-up power supply circuit 23B so that the boosting range in the step-up power supply circuit 23B becomes narrower than the boosting range at the normal time. At the same time, the PWM control circuit 21B maintains the duty cycle of the PWM signal at the duty cycle setting at the normal time or sets the duty cycle to a value greater than at the normal time. When the output voltage VOUT from the step-up power supply circuit 23B is lowered to reduce the load due to boosting by the step-up power supply circuit 23 and the duty cycle of the PWM signal is maintained at the duty cycle setting at the normal time or set to a value greater than at the normal time, it is possible to restrain the brightness of the backlight 10 from being lowered.

The operation of the PWM control circuit 21B described above is summarized in Table 1 below. Table 1 indicates the operation in the areas, filled in with the first borderline 51 taken as a boundary, in which the predetermined complex voltage-and-temperature condition is satisfied.

TABLE 1

| | Input voltage ≥ Th$_v$ | Input voltage < Th$_v$ |
|---|---|---|
| Ambient temperature ≤ Th$_t$ | — | Narrow the boosting range, and maintain or raise the duty cycle of the PWM |
| Ambient temperature > Th$_t$ | Lower the duty cycle of the PWM signal. | Lower the duty cycle of the PWM signal. |

Figure 9:
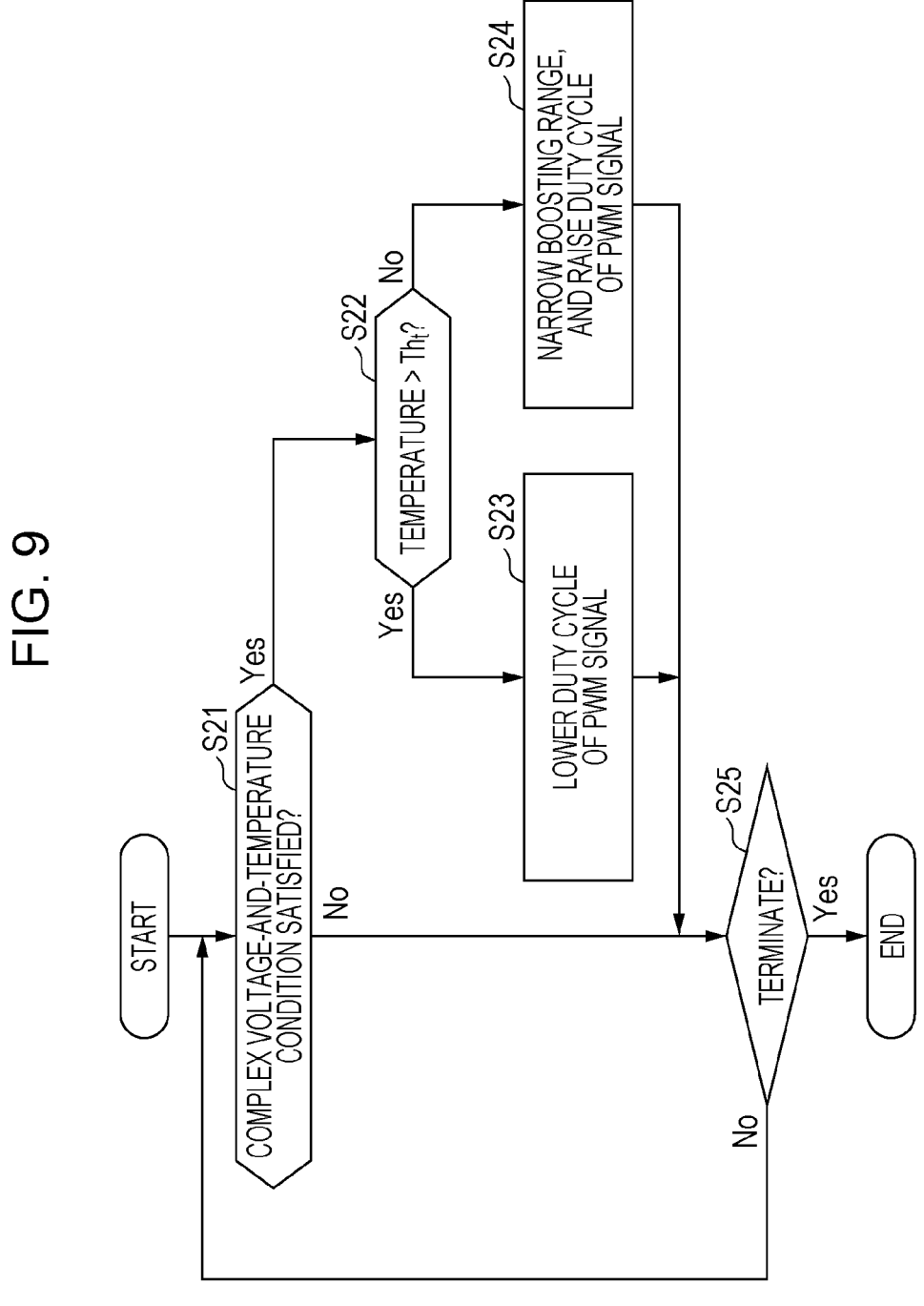
FIG. 9 is a flowchart illustrating an example of the operation of the backlight control device in the third embodiment.

FIG. 9 is a flowchart illustrating an example of the operation of the backlight control device 20B in the third embodiment. The flowchart in FIG. 9 starts when the power supply of the backlight control device 20B is turned on. In this flowchart, only an operation involved in the substance of the third embodiment is illustrated and a dimming operation and the like at the normal time are omitted.

First, the PWM control circuit 21B decides whether the ambient temperature, detected by the temperature sensor 12, of the LED matrix 11 and the input voltage VIN, detected by the voltage sensor 24, to the step-up power supply circuit 23 satisfy the predetermined complex voltage-and-temperature condition prescribed by the first borderline 51 in FIG. 8 (step S21). If the PWM control circuit 21B decides that the predetermined complex voltage-and-temperature condition is satisfied, the PWM control circuit 21B further decides whether the ambient temperature, detected by the temperature sensor 12, of the LED matrix 11 is higher than the predetermined temperature threshold Tht (step S22).

If the PWM control circuit 21B decides that the ambient temperature of the LED matrix 11 is higher than the predetermined temperature threshold Tht, the PWM control circuit 21B sets the duty cycle of the PWM signal to a value smaller than the duty cycle setting at the normal time (step S23). If the PWM control circuit 21B decides that the ambient temperature of the LED matrix 11 is not higher than the predetermined temperature threshold Tht, the PWM control circuit 21B controls the step-up power supply circuit 23B so that the boosting range in the step-up power supply circuit 23B becomes narrower than the boosting range at the normal time, and sets the duty cycle of the PWM signal to a value, which is, for example, greater than the duty cycle setting at the normal time (step S24).

In step S21 above, if the PWM control circuit 21B decides that the predetermined complex voltage-and-temperature condition is not satisfied, the process proceeds to step S25. Upon the completion of the execution of processing in step S23 or S24, the process also proceeds to step S25. In step S25, the backlight control device 20B decides whether to terminate the process. Here, the backlight control device 20B decides whether a manipulation to turn off the power supply of the backlight control device 20B has been performed. If a manipulation to turn off the power supply has not been performed, the process returns to step S21. If a manipulation to turn off the power supply has been performed, the process in the flowcharts in FIG. 9 is terminated.

In the example of the structure described with reference to FIG. 7, the PWM control circuit 21B has been notified of the input voltage VIN, detected by the voltage sensor 24, to the step-up power supply circuit 23B and has controlled the boosting range in the step-up power supply circuit 23B accordingly. However, the present disclosure is not limited to this structure. For example, the PWM control circuit 21B may notify the step-up power supply circuit 23B whether the predetermined complex voltage-and-temperature condition is satisfied and may also notify the step-up power supply circuit 23B of the ambient temperature, detected by the temperature sensor 12, of the LED matrix 11. Then, the step-up power supply circuit 23B may decide whether the ambient temperature of the LED matrix 11 is higher than predetermined temperature threshold Tht and may control the boosting range by itself according to the decision result. This is also true for a fourth embodiment described below.

Fourth Embodiment

Figure 10:
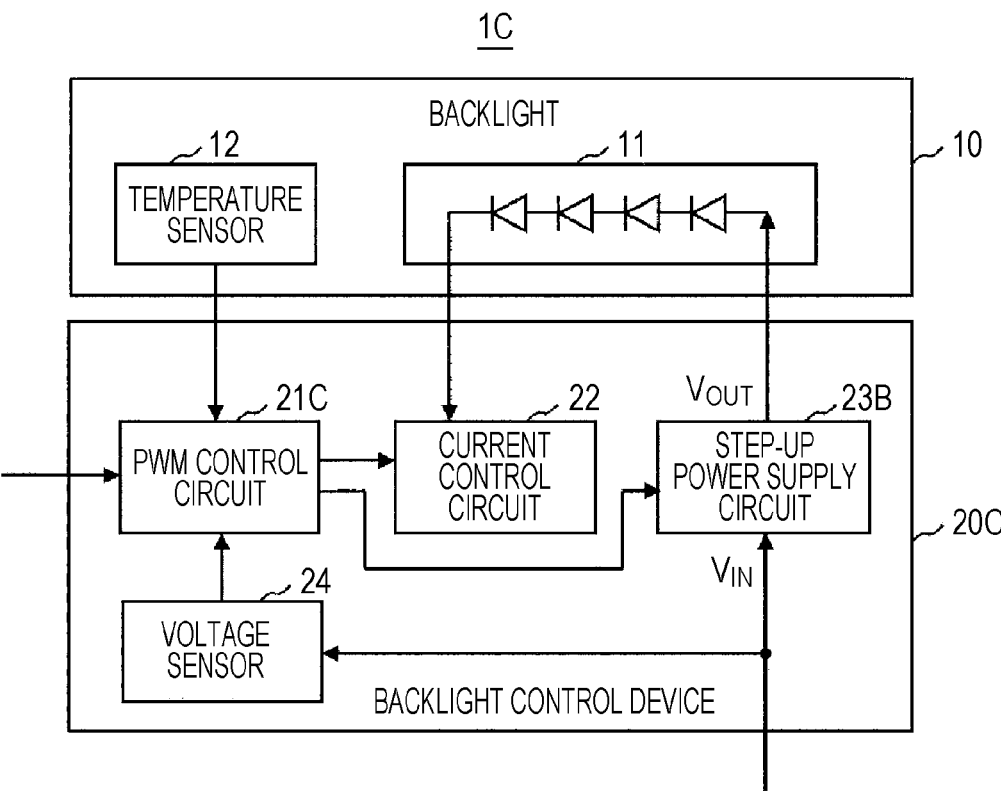
FIG. 10 illustrates an example of the structure of a liquid crystal display unit in which a power supply circuit protection device and backlight control device in a fourth embodiment are applied, the backlight control device being in a step-up constant-current driving method.

Next, a fourth embodiment of the present disclosure will be described with reference to the drawings. FIG. 10 illustrates an example of the structure of a liquid crystal display unit in which a power supply circuit protection device and backlight control device in a fourth embodiment are applied, the backlight control device being in a step-up constant-current driving method. The liquid crystal display unit 1C in the fourth embodiment is also mounted in, for example, a vehicle. The display on the liquid crystal display unit 1C is controlled by an electronic device mounted in the vehicle.

In FIG. 10, elements given the same reference numerals as in FIG. 7 have the same functions as the corresponding elements in FIG. 7. Therefore, repeated descriptions will be omitted. As illustrated in FIG. 10, the liquid crystal display unit 1C in the fourth embodiment has a backlight control device 20C instead of the backlight control device 20B. The backlight control device 20C has a PWM control circuit 21C instead of the PWM control circuit 21B.

Figure 11:
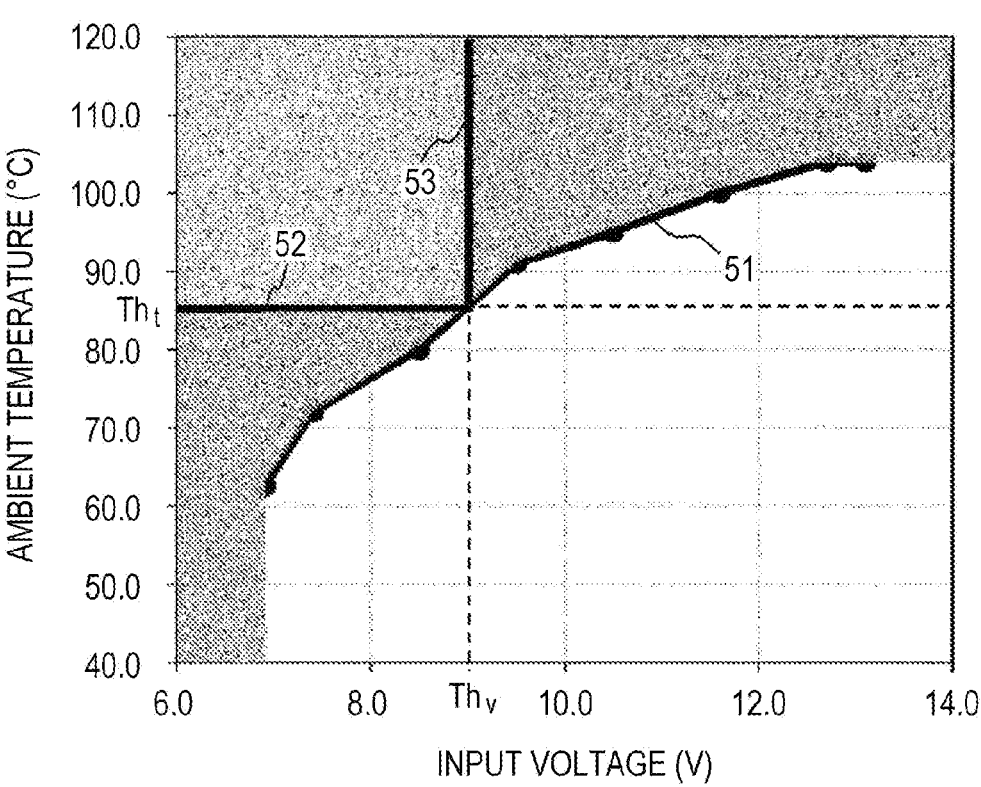
FIG. 11 illustrates control by a PWM control circuit in the fourth embodiment.
Figure 13:
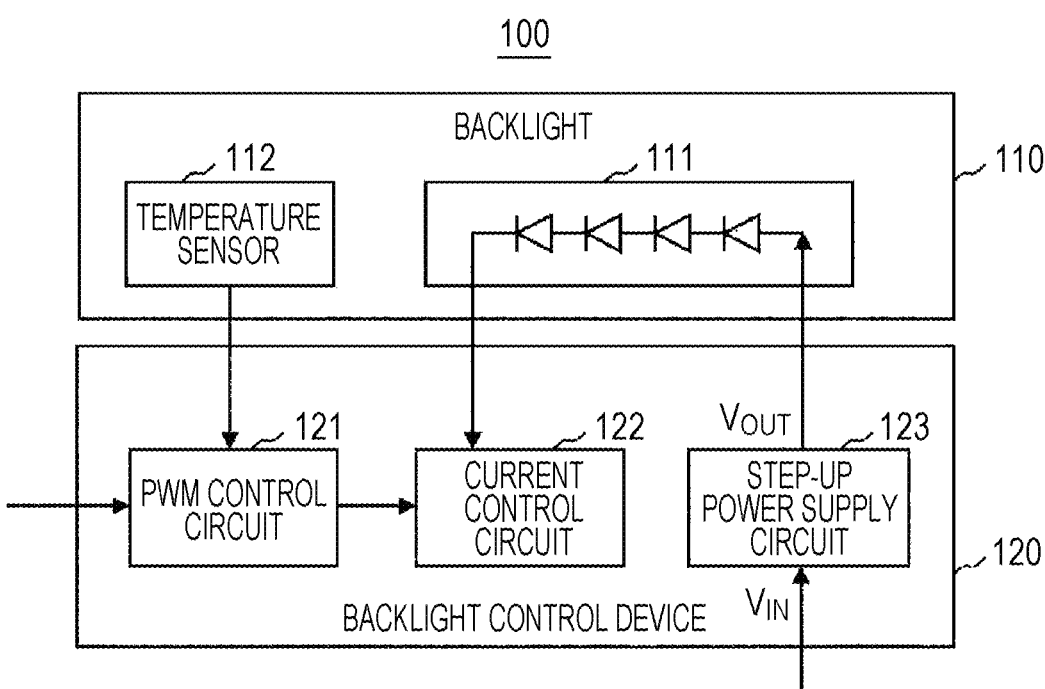
FIG. 13 schematically illustrates an example of the structure of a liquid crystal display unit in which a conventional backlight control device in a step-up constant-current driving method is used.

FIG. 11 illustrates control by the PWM control circuit 21C in the fourth embodiment. In FIG. 11, the vertical axis indicates the ambient temperature, detected by the temperature sensor 12, of the LED matrix 11, and the horizontal axis indicates the input voltage VIN, detected by the voltage sensor 24, to the step-up power supply circuit 23B. The borderlines 51 and 52 in FIG. 11 are identical to those in FIG. 8. The fourth embodiment differs from the third embodiment illustrated in FIG. 8 in that the area above the second borderline 52 is divided into two areas by a third borderline 53. In one of them, the ambient temperature is lower than the predetermined voltage threshold Thv. In the other area, the ambient temperature is higher than or equal to the predetermined voltage threshold Thv.

In the area in which the ambient temperature of the LED matrix 11 is lower than or equal to the predetermined temperature threshold Tht, the area being one of the areas filled in with the first borderline 51 taken as a boundary (that is, in the area below the second borderline 52), control by the PWM control circuit 21C is as in the second embodiment. That is, when it is sensed in the range in which the predetermined complex voltage-and-temperature condition is satisfied that the input voltage VIN detected by the voltage sensor 24 satisfies the predetermined voltage condition (that is, the input voltage VIN is lower than the voltage threshold Thv) and that the ambient temperature, detected by the temperature sensor 12, of the LED matrix 11 does not satisfy the predetermined temperature condition (that is, the ambient temperature is lower than or equal to the predetermined temperature threshold Tht), the PWM control circuit 21C controls the step-up power supply circuit 23B so that boosting range in the step-up power supply circuit 23B becomes narrower than the boosting range at the normal time. At the same time, the PWM control circuit 21C maintains the duty cycle of the PWM signal at the duty cycle setting at the normal time or sets the duty cycle to a value greater than at the normal time.

In the area in which the input voltage VIN to the step-up power supply circuit 23B is higher than or equal to the predetermined voltage threshold Thy, the area being one of the areas in which the predetermined complex voltage-and-temperature condition is satisfied and the ambient temperature of the LED matrix 11 is higher than the predetermined temperature threshold Tht (that is, in the area to the right of the third borderline 53), control by the PWM control circuit 21C is also as in the second embodiment. That is, when it is sensed in the range in which the predetermined complex voltage-and-temperature condition is satisfied that the input voltage VIN detected by the voltage sensor 24 does not satisfy the predetermined voltage condition (that is, the input voltage VIN is higher than or equal to the voltage threshold Thy) and that the ambient temperature, detected by the temperature sensor 12, of the LED matrix 11 satisfies the predetermined temperature condition (that is, the ambient temperature is higher than the predetermined temperature threshold Tht), the PWM control circuit 21C sets the boosting range in the step-up power supply circuit 23B to the boosting range at the normal time, and also sets the duty cycle of the PWM signal to a value smaller than at the duty cycle setting at the normal time.

In the area in which the input voltage VIN to the step-up power supply circuit 23B is lower than the predetermined voltage threshold Thy, the area being one of the areas in which the predetermined complex voltage-and-temperature condition is satisfied and the ambient temperature of the LED matrix 11 is higher than the predetermined temperature threshold Tht (that is, in the area to the left of the third borderline 53), control by the PWM control circuit 21C is performed as described below. That is, when it is sensed in the range in which the predetermined complex voltage-and-temperature condition is satisfied that the input voltage VIN detected by the voltage sensor 24 satisfies the predetermined voltage condition (that is, the input voltage VIN is lower than the voltage threshold Thy) and that the ambient temperature, detected by the temperature sensor 12, of the LED matrix 11 satisfies the predetermined temperature condition (that is, the ambient temperature is higher than the predetermined temperature threshold Tht), the PWM control circuit 21C controls the step-up power supply circuit 23B so that the boosting range in the step-up power supply circuit 23B becomes narrower than the boosting range at the normal time, and sets the duty cycle of the PWM signal to a value smaller than at the normal time.

As described above, when the boosting range in the step-up power supply circuit 23B is narrowed to lower the output voltage VOUT and the duty cycle of the PWM signal is lowered, the brightness of the backlight 10 is lowered. Therefore, which of protection of parts from breakdown and the securing of brightness of the backlight 10 is prioritized may be made selectable by specifying a mode. For example, the third embodiment may be applied when a mode to prioritize the securing of brightness of the backlight 10 is specified, and the fourth embodiment may be applied when a mode to prioritize protection of parts from breakdown is specified.

The operation of the PWM control circuit 21C described above is summarized in Table 2 below. Table 2 indicates the operation in the area, filled in with the first borderline 51 taken as a boundary, in which the predetermined complex voltage-and-temperature condition is satisfied.

TABLE 2

|  | Input voltage ≥ Thv | Input voltage < Thv |
|---|---|---|
| Ambient temperature ≤ Tht | — | Narrow the boosting range, and maintain or raise the duty cycle of the PWM signal. |
| Ambient temperature > Tht | Lower the duty cycle of the PWM signal. | Narrow the boosting range, and lower the duty cycle of the PWM signal. |

Figure 12:
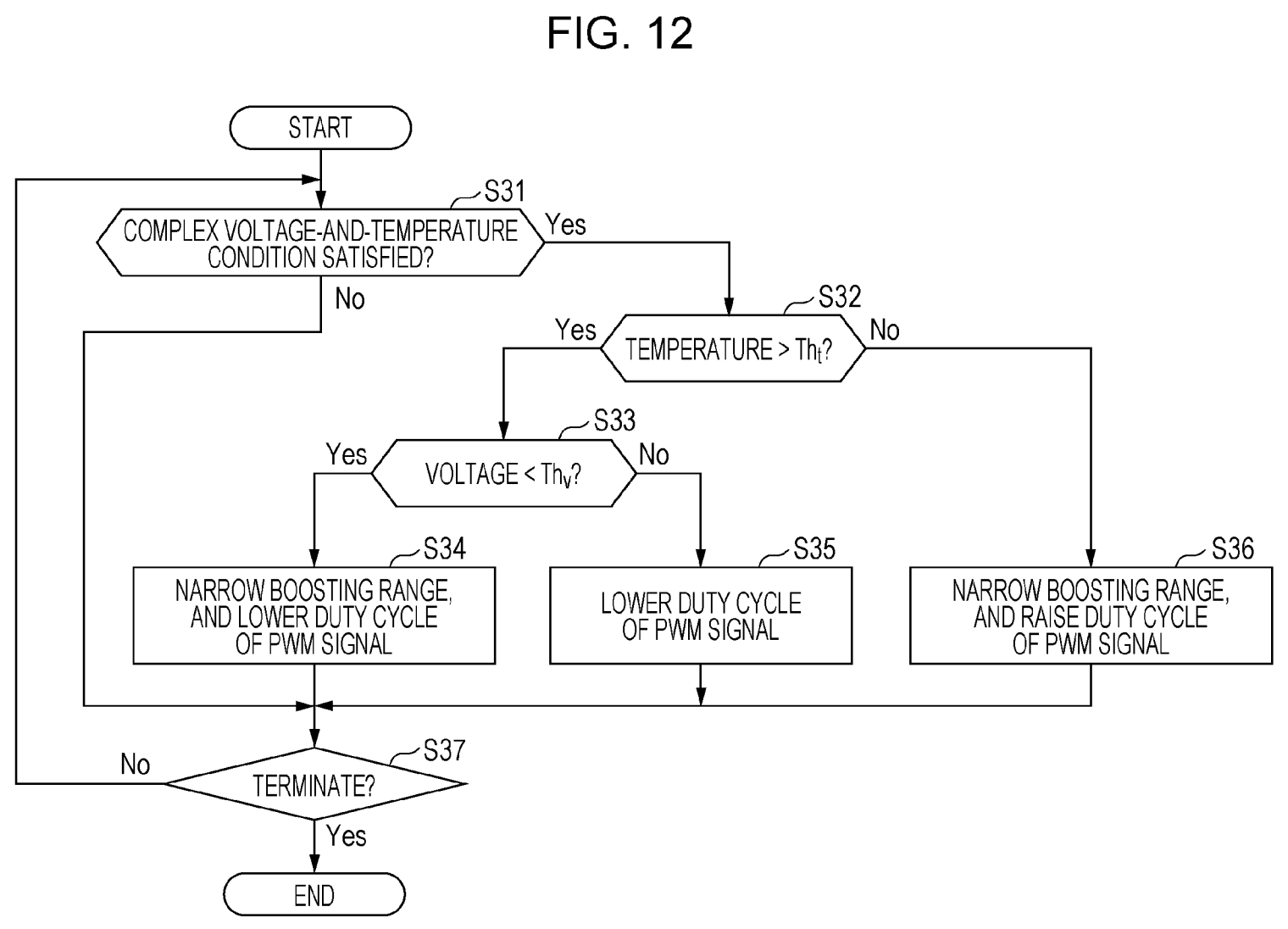

FIG. 12 is a flowchart illustrating an example of the operation of the backlight control device 20C in the fourth embodiment. The flowchart in FIG. 12 starts when the power supply of the backlight control device 20C is turned on. In this flowchart, only an operation involved in the substance of the fourth embodiment is illustrated and a dimming operation and the like at the normal time are omitted.

First, the PWM control circuit 21C decides whether the ambient temperature, detected by the temperature sensor 12, of the LED matrix 11 and the input voltage VIN, detected by the voltage sensor 24, to the step-up power supply circuit 23 satisfy the predetermined complex voltage-and-temperature condition prescribed by the first borderline 51 in FIG. 11 (step S31). If the PWM control circuit 21C decides that the predetermined complex voltage-and-temperature condition is satisfied, the PWM control circuit 21C further decides whether the ambient temperature, detected by the temperature sensor 12, of the LED matrix 11 is higher than the predetermined temperature threshold Tht (step S32).

If the PWM control circuit 21C decides that the ambient temperature of the LED matrix 11 is higher than the predetermined temperature threshold Tht, the PWM control circuit 21C further decides whether the input voltage VIN, detected by the voltage sensor 24, to the step-up power supply circuit 23B is lower than the predetermined voltage threshold Thy (step S33). If the PWM control circuit 21C decides that the input voltage VIN to the step-up power supply circuit 23B is lower than the predetermined voltage threshold Thy, the PWM control circuit 21C controls the step-up power supply circuit 23B so that the boosting range in the step-up power supply circuit 23B becomes narrower than the boosting range at the normal time, and sets the duty cycle of the PWM signal to a value smaller than the duty cycle setting at the normal time (step S34).

If the PWM control circuit 21C decides in step S33 that the input voltage VIN is not lower than the predetermined voltage threshold Thy, the PWM control circuit 21C maintains the boosting range in the step-up power supply circuit 23B at the boosting range at the normal time, and sets the duty cycle of the PWM signal to a value smaller than the duty cycle setting at the normal time (step S35).

If the PWM control circuit 21C decides in step S32 above that the ambient temperature of the LED matrix 11 is not higher than the predetermined temperature threshold Tht, the PWM control circuit 21C controls the step-up power supply circuit 23B so that the boosting range in the step-up power supply circuit 23B becomes narrower than the boosting range at the normal time, and sets the duty cycle of the PWM signal to a value, which is, for example, greater than the duty cycle setting at the normal time (step S36).

If the PWM control circuit 21C decides in step S31 above that predetermined complex voltage-and-temperature condition is not satisfied, the process proceeds to step S37. Upon the completion of the execution of processing in any one of steps S34 to S36, the process also proceeds to step S37. In step S37, the backlight control device 20C decides whether to terminate the process. Here, the backlight control device 20C decides whether a manipulation to turn off the power supply of the backlight control device 20C has been performed. If a manipulation to turn off the power supply has not been performed, the process returns to step S31. If a manipulation to turn off the power supply of has been performed, the process in the flowcharts in FIG. 12 is terminated.

The above first to fourth embodiments have been just described as examples to illustrate the present disclosure. It should not be interpreted that these embodiments limit the technical range of the present disclosure. For example, although a liquid crystal display unit mounted in a vehicle has been taken as an example in the descriptions of the above first to fourth embodiments, the present disclosure can also be applied to liquid crystal display units that are not mounted in vehicles. Examples in which a power supply circuit protection device is applied to a backlight control device have been also described in the above first to fourth embodiments. However, circuits eligible for being controlled are not limited to backlights. When a circuit other than a backlight is used as the circuit eligible for being controlled, the temperature sensor 12 is likely to be eliminated. If the temperature sensor 12 is eliminated, control of the duty cycle of the PWM signal is omitted, which would other be performed according to the ambient temperature of the circuit eligible for being controlled.

Although, in the above first to fourth embodiments, a step-up power supply circuit has been described as an example of the power supply circuit, this is not a limitation on the present disclosure. For example, the power supply circuit may be a step-down power supply circuit that lowers an input voltage and applies an output voltage, resulting from lowering, to the circuit eligible for being controlled as the power supply voltage. It is also possible to apply the power supply circuit protection device in the above embodiments to a backlight control device in, for example, a step-down constant-current driving method or a step-up/down constant-current driving method. When a step-down power supply circuit is used, the predetermined voltage condition is that the input voltage detected by the voltage sensor 24 is higher than or equal to a predetermined voltage threshold.

Accordingly, the above embodiments and implementations have been described as examples of the present disclosure. It should not be interpreted that the above embodiments and implementations limit the technical range of the present disclosure. That is, the present disclosure can be practiced in various other forms without departing from the spirit and main features of the present disclosure.

The invention claimed is:

1. A power supply circuit protection device configured to protect a power supply circuit that is configured to transform an input voltage and to apply, as a power supply voltage, an output voltage, resulting from the transforming, to a circuit eligible for being controlled, the power supply circuit protection device comprising:

a control signal generation unit configured to generate a control signal comprising a pulse wave having a duty cycle with a variable setting;

a target circuit control unit that is configured to control an operation of the circuit eligible for being controlled, according to the control signal generated by the control signal generation unit; and a voltage detection unit configured to detect the input voltage to be supplied to the power supply circuit;

wherein when the input voltage detected by the voltage detection unit is sensed to satisfy a predetermined voltage condition, the control signal generation unit is configured to set the duty cycle of the control signal to a value smaller than a duty cycle setting at a normal time; and wherein the power supply circuit device further comprises:

a temperature detection unit configured to detect an ambient temperature affected by heat generated by the circuit eligible for being controlled;

wherein a predetermined complex voltage-and-temperature condition is used instead of the predetermined voltage condition; and wherein when the input voltage detected by the voltage detection unit and the ambient temperature detected by the temperature detection unit are sensed to satisfy the predetermined complex voltage-and-temperature condition, the control signal generation unit is configured to set the duty cycle of the control signal to a value smaller than the duty cycle setting at the normal time.

2. The power supply circuit protection device according to claim 1, wherein:

the power supply circuit is a step-up power supply circuit configured to raise the input voltage and to apply, as the power supply voltage, the output voltage, resulting from the raising, to the circuit eligible for being controlled; and the predetermined voltage condition is that the input voltage detected by the voltage detection unit is lower than a predetermined voltage threshold.

3. The power supply circuit protection device according to claim 1, wherein:

the power supply circuit is a step-down power supply circuit configured to lower the input voltage and to apply, as the power supply voltage, the output voltage, resulting from the lowering, to the circuit eligible for being controlled; and the predetermined voltage condition is that the input voltage detected by the voltage detection unit is higher than or equal to a predetermined voltage threshold.

4. A power supply circuit protection device configured to protect a power supply circuit that is configured to transform an input voltage and to apply, as a power supply voltage, an output voltage, resulting from the transforming, to a circuit eligible for being controlled, the power supply circuit protection device comprising:

a control signal generation unit configured to generate a control signal comprising a pulse wave having a duty cycle with a variable setting;

a target circuit control unit that is configured to control an operation of the circuit eligible for being controlled, according to the control signal generated by the control signal generation unit; and a voltage detection unit configured to detect the input voltage to be supplied to the power supply circuit;

wherein when the input voltage detected by the voltage detection unit is sensed to satisfy a predetermined voltage condition, the control signal generation unit is configured to set the duty cycle of the control signal to a value smaller than a duty cycle setting at a normal time; and wherein the power supply circuit device further comprises:

a temperature detection unit configured to detect an ambient temperature affected by heat generated by the circuit eligible for being controlled;

wherein a predetermined complex voltage-and-temperature condition is used instead of the predetermined voltage condition;

wherein when the ambient temperature detected by the temperature detection unit is sensed to satisfy a predetermined temperature condition in a range in which the input voltage detected by the voltage detection unit and the ambient temperature detected by the temperature detection unit satisfy the predetermined complex voltage-and-temperature condition, the control signal generation unit is configured to set the duty cycle of the control signal to a value smaller than the duty cycle setting at the normal time; and wherein when the ambient temperature detected by the temperature detection unit is sensed not to satisfy the predetermined temperature condition in the range in which the input voltage detected by the voltage detection unit and the ambient temperature detected by the temperature detection unit satisfy the predetermined complex voltage-and-temperature condition, the power supply circuit is configured to establish a range by which to transform the input voltage to the output voltage narrower than a transformation range at the normal time and the control signal generation unit is configured to set the duty cycle of the control signal to a value equal to or greater than the duty cycle setting at the normal time.

5. The power supply circuit protection device according to claim 4, wherein:

the power supply circuit is a step-up power supply circuit configured to raise the input voltage and to apply, as the power supply voltage, the output voltage, resulting from the raising, to the circuit eligible for being controlled; and the predetermined voltage condition is that the input voltage detected by the voltage detection unit is lower than a predetermined voltage threshold.

6. The power supply circuit protection device according to claim 4, wherein:

the power supply circuit is a step-down power supply circuit configured to lower the input voltage and to apply, as the power supply voltage, the output voltage, resulting from the lowering, to the circuit eligible for being controlled; and the predetermined voltage condition is that the input voltage detected by the voltage detection unit is higher than or equal to a predetermined voltage threshold.

7. A power supply circuit protection device configured to protect a power supply circuit that is configured to transform an input voltage and to apply, as a power supply voltage, an output voltage, resulting from the transforming, to a circuit eligible for being controlled, the power supply circuit protection device comprising:

a control signal generation unit configured to generate a control signal comprising a pulse wave having a duty cycle with a variable setting;

a target circuit control unit that is configured to control an operation of the circuit eligible for being controlled, according to the control signal generated by the control signal generation unit; and a voltage detection unit configured to detect the input voltage to be supplied to the power supply circuit;

wherein when the input voltage detected by the voltage detection unit is sensed to satisfy a predetermined voltage condition, the control signal generation unit is configured to set the duty cycle of the control signal to a value smaller than a duty cycle setting at a normal time; and wherein the power supply circuit device further comprises:

a temperature detection unit configured to detect an ambient temperature affected by heat generated by the circuit eligible for being controlled;

wherein when the input voltage detected by the voltage detection unit is sensed to satisfy the predetermined voltage condition and the ambient temperature detected by the temperature detection unit is sensed to satisfy a predetermined temperature condition in a range in which the input voltage detected by the voltage detection unit and the ambient temperature detected by the temperature detection unit satisfy a predetermined complex voltage-and-temperature condition, the power supply circuit is configured to establish a range by which to transform the input voltage to the output voltage narrower than a transformation range at the normal time and the control signal generation unit is configured to set the duty cycle of the control signal to a value smaller than the duty cycle setting at the normal time; or wherein when the input voltage detected by the voltage detection unit is sensed not to satisfy the predetermined voltage condition and the ambient temperature detected by the temperature detection unit is sensed to satisfy the predetermined temperature condition in the range in which the input voltage detected by the voltage detection unit and the ambient temperature detected by the temperature detection unit satisfy the predetermined complex voltage-and-temperature condition, the power supply circuit is configured to establish the range by which to transform the input voltage to the output voltage equal to the transformation range at the normal time and the control signal generation unit is configured to set the duty cycle of the control signal to a value smaller than the duty cycle setting at the normal time; or wherein when the input voltage detected by the voltage detection unit is sensed to satisfy the predetermined voltage condition and the ambient temperature detected by the temperature detection unit is sensed not to satisfy the predetermined temperature condition in the range in which the input voltage detected by the voltage detection unit and the ambient temperature detected by the temperature detection unit satisfy the predetermined complex voltage-and-temperature condition, the power supply circuit is configured to establish the range by which to transform the input voltage to the output voltage narrower than the transformation range at the normal time and the control signal generation unit is configured to set the duty cycle of the control signal to a value larger than or equal to the duty cycle setting at the normal time.

8. The power supply circuit protection device according to claim 7, wherein:

the power supply circuit is a step-up power supply circuit configured to raise the input voltage and to apply, as the power supply voltage, the output voltage, resulting from the raising, to the circuit eligible for being controlled; and the predetermined voltage condition is that the input voltage detected by the voltage detection unit is lower than a predetermined voltage threshold.

9. The power supply circuit protection device according to claim 7, wherein:

the power supply circuit is a step-down power supply circuit configured to lower the input voltage and to apply, as the power supply voltage, the output voltage, resulting from the lowering, to the circuit eligible for being controlled; and the predetermined voltage condition is that the input voltage detected by the voltage detection unit is higher than or equal to a predetermined voltage threshold.

10. A power supply circuit protection method of protecting, in an electronic device that has a power supply circuit that transforms an input voltage and applies, as a power supply voltage, an output voltage, resulting from the transforming, to a circuit eligible for being controlled, a control signal generation unit that generates a control signal composed of a pulse wave having a duty cycle with a variable setting, and a target circuit control unit that controls an operation of the circuit eligible for being controlled, according to the control signal generated by the control signal generation unit, the power supply circuit, the method comprising:

detecting, with a voltage detection unit, the input voltage to be supplied to the power supply circuit;

when the input voltage detected by the voltage detection unit is sensed to satisfy a predetermined voltage condition, setting, with the control signal generation unit, the duty cycle of the control signal to a value smaller than a duty cycle setting at a normal time; and wherein the electronic device further includes a temperature detection unit that detects an ambient temperature affected by heat generated by the circuit eligible for being controlled, the electronic device setting, when the ambient temperature detected by the temperature detection unit is sensed to satisfy a predetermined temperature condition, the duty cycle of the control signal to a value smaller than the duty cycle setting at the normal time to protect the circuit eligible for being controlled, and the method further comprises:

when the input voltage detected by the voltage detection unit is sensed to satisfy the predetermined voltage condition or when the ambient temperature detected by the temperature detection unit is sensed to satisfy the predetermined temperature condition, setting, with the control signal generation unit, the duty cycle of the control signal to a value smaller than the duty cycle setting at the normal time.

11. A power supply circuit protection method of protecting, in an electronic device that has a power supply circuit that transforms an input voltage and applies, as a power supply voltage, an output voltage, resulting from the transforming, to a circuit eligible for being controlled, a control signal generation unit that generates a control signal composed of a pulse wave having a duty cycle with a variable setting, and a target circuit control unit that controls an operation of the circuit eligible for being controlled, according to the control signal generated by the control signal generation unit, the power supply circuit, the method comprising:

detecting, with a voltage detection unit, the input voltage to be supplied to the power supply circuit;

when the input voltage detected by the voltage detection unit is sensed to satisfy a predetermined voltage condition, setting, with the control signal generation unit, the duty cycle of the control signal to a value smaller than a duty cycle setting at a normal time; and wherein the electronic device further includes a temperature detection unit that detects an ambient temperature affected by heat generated by the circuit eligible for being controlled, the electronic device setting, when the ambient temperature detected by the temperature detection unit is sensed to satisfy a predetermined temperature condition, the duty cycle of the control signal to a value smaller than the duty cycle setting at the normal time to protect the circuit eligible for being controlled, wherein:

a predetermined complex voltage-and-temperature condition is used instead of the predetermined voltage condition; and when the input voltage detected by the voltage detection unit and the ambient temperature detected by the temperature detection unit are sensed to satisfy the predetermined complex voltage-and-temperature condition, the control signal generation unit sets the duty cycle of the control signal to a value smaller than the duty cycle setting at the normal time.

12. A power supply circuit protection method of protecting, in an electronic device that has a power supply circuit that transforms an input voltage and applies, as a power supply voltage, an output voltage, resulting from the transforming, to a circuit eligible for being controlled, a control signal generation unit that generates a control signal composed of a pulse wave having a duty cycle with a variable setting, and a target circuit control unit that controls an operation of the circuit eligible for being controlled, according to the control signal generated by the control signal generation unit, the power supply circuit, the method comprising:

detecting, with a voltage detection unit, the input voltage to be supplied to the power supply circuit;

when the input voltage detected by the voltage detection unit is sensed to satisfy a predetermined voltage condition, setting, with the control signal generation unit, the duty cycle of the control signal to a value smaller than a duty cycle setting at a normal time; and wherein the electronic device further includes a temperature detection unit that detects an ambient temperature affected by heat generated by the circuit eligible for being controlled, the electronic device setting, when the ambient temperature detected by the temperature detection unit is sensed to satisfy a predetermined temperature condition, the duty cycle of the control signal to a value smaller than the duty cycle setting at the normal time to protect the circuit eligible for being controlled, wherein:

a predetermined complex voltage-and-temperature condition is used instead of the predetermined voltage condition;

when the ambient temperature detected by the temperature detection unit is sensed to satisfy the predetermined temperature condition in a range in which the input voltage detected by the voltage detection unit and the ambient temperature detected by the temperature detection unit satisfy the predetermined complex voltage-and-temperature condition, the control signal generation unit sets the duty cycle of the control signal to a value smaller than the duty cycle setting at the normal time; and when the ambient temperature detected by the temperature detection unit is sensed not to satisfy the predetermined temperature condition in the range in which the input voltage detected by the voltage detection unit and the ambient temperature detected by the temperature detection unit satisfy the predetermined complex voltage-and-temperature condition, the power supply circuit makes a range by which to transform the input voltage to the output voltage narrower than a transformation range at the normal time and the control signal generation unit sets the duty cycle of the control signal to a value equal to or greater than the duty cycle setting at the normal time.

\* \* \* \* \*